(12) United States Patent
Dykema et al.

(10) Patent No.: US 6,733,061 B1
(45) Date of Patent: May 11, 2004

(54) METHOD AND APPARATUS FOR INSTALLING A STOWAGE CABINET IN A MOTOR VEHICLE

(75) Inventors: Mark H. Dykema, Wallaceburg (CA); Sonny S. Galea, Harrow (CA)

(73) Assignee: International Truck and Engine Corporation Canada, Warrenville, IL (US)

( * ) Notice: Subject to any disclaimer, the term of this patent is extended or adjusted under 35 U.S.C. 154(b) by 0 days.

(21) Appl. No.: 10/308,830

(22) Filed: Dec. 3, 2002

(51) Int. Cl.$^7$ ................................................ B60R 7/00
(52) U.S. Cl. ..................................... 296/37.7; 312/245
(58) Field of Search ............................... 296/37.7, 24.1; 312/245; 224/311, 538

(56) References Cited

U.S. PATENT DOCUMENTS

| | | | | |
|---|---|---|---|---|
| 2,733,887 A | * | 2/1956 | Schmidt | ..................... 312/245 |
| 3,497,281 A | * | 2/1970 | Wilde | ......................... 312/245 |
| 4,180,299 A | * | 12/1979 | Tolerson | ..................... 312/242 |
| 4,717,102 A | * | 1/1988 | Pflieger | ....................... 312/245 |
| 4,783,110 A | * | 11/1988 | Beukema et al. | .......... 296/37.7 |
| 5,108,048 A | | 4/1992 | Chang | |
| 5,441,326 A | * | 8/1995 | Mikalonis | .................. 296/37.7 |
| 5,549,258 A | | 8/1996 | Hart et al. | |
| 5,842,668 A | * | 12/1998 | Spencer | .................... 244/118.5 |
| 6,318,671 B1 | | 11/2001 | Schumacher et al. | |

* cited by examiner

Primary Examiner—Dennis H. Pedder
(74) Attorney, Agent, or Firm—Jeffrey P. Calfa; Dennis Kelly Sullivan; Susan L. Lukasik

(57) ABSTRACT

A stowage cabinet installs within a motor vehicle frame using cabinet and roof cleats. The cabinet cleat mounts to the stowage cabinet before installing the cabinet within the motor vehicle. The cabinet cleat engages a roof cleat that is fastened to the roof. The stowage cabinet is held in place by the cabinet cleat nested within the roof cleat while the stowage cabinet is fastened at other locations to the vehicle frame.

8 Claims, 7 Drawing Sheets

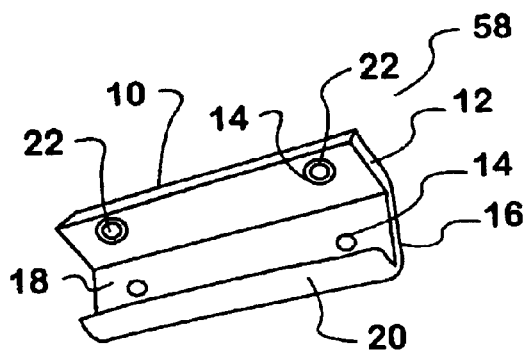
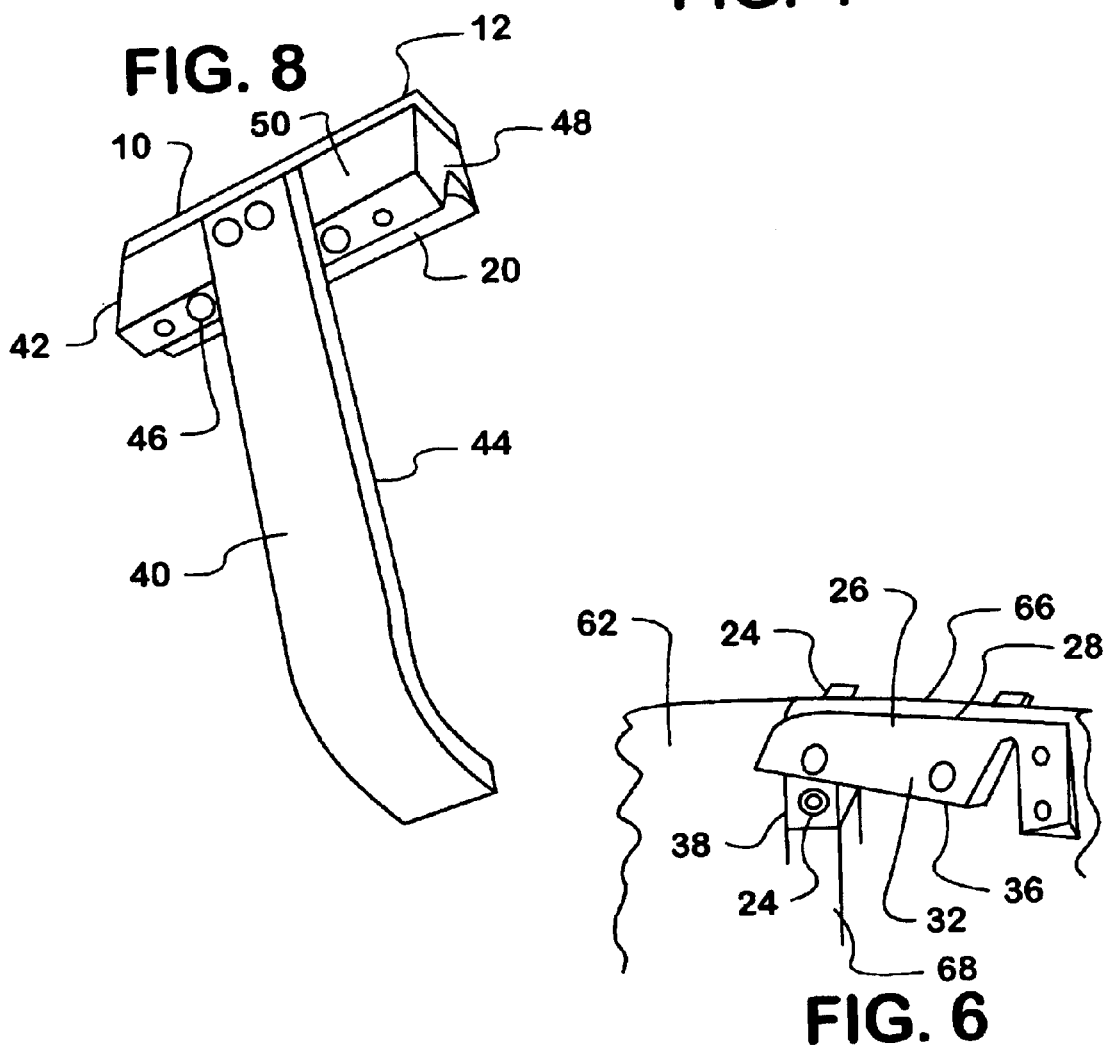

METHOD AND APPARATUS FOR INSTALLING A STOWAGE CABINET IN A MOTOR VEHICLE

BACKGROUND OF THE INVENTION

1. Field of the Invention

The present invention relates to a method and device for installing a stowage cabinet inside a motor vehicle.

2. Description of the Prior Art

Many types of vehicles, such as trucks, trains and aircraft are often equipped with stowage cabinets for storage. These cabinets mount to the vehicle's frame with hardware, such as metal fittings, bolts, rods, and the like. In aircraft, for example, connection points for connecting the hardware to the frame are provided on spars, frame or rib members, stringers, and fuselage skin and are usually visible when attaching the cabinet. In trucks, however, connection points are often hidden on the frame behind the headliner.

In an era of streamlined design and enhanced quality control, especially for trucks, stowage cabinets should not be misaligned or appear deformed after installation. The fit and finish of both the cabin and the cabinets after installation should reflect a high degree of quality. Customers, therefore, should not see any misalignment or deformation around the installed cabinets or trim.

In trucks, the streamlined design of the cab has contributed to additional problems in mounting a stowage cabinet. In the prior art shown in FIGS. 1 and 2, cabinet mount 110 fastens to the top front of stowage cabinet 62. The design of cabinet mount 110 requires cabinet mount 110 to abut against the roof headliner of a vehicle. While holding the cabinet in place, the cabinet is mounted by driving screws through a flat thin surface into the vehicle frame at the roof. Yet the streamlined design of the cab allows a worker limited access to directly install the screws into the roof. If a sidewinder tool is used to install the screws, the worker must hold his hands at an awkward angle to hold the tool in position. This awkward angle is not only unergonomic and strains the worker's wrists, but it increases the time for installation of the cabinet. Furthermore, if the worker overtightens the screws, the cabinet itself can deform and no longer fit cleanly against the wall and roof of the vehicle.

If the cabinet door is first removed, a worker can use standard tools to mount the cabinet. While this method eliminates the unergonomic conditions, the bulky door is awkward to properly reinstall into the mounted cabinet. The worker may have to stand on a ladder or scaffold while trying to properly align and fasten the door in place within the mounted cabinet Reinstalling the door not only increases the time of installation, but it does not eliminate the problem of cabinet deformation due to overtightened screws.

Therefore, one object of the invention is to easily and efficiently mount the cabinet to the vehicle using standard tools. Another object of the invention is to allow the ergonomic installation of the cabinet. Still another object of the invention is to reduce or prevent the deformation of the cabinet due to overtightened fasteners.

SUMMARY OF THE INVENTION

According to the invention there is provided a method and apparatus for installing a stowage cabinet in a motor vehicle. The apparatus has a stowage cabinet with a front, a back and sides between the front and back, and a cabinet cleat top mounted to a cabinet cleat. The cabinet cleat top extends from the front toward the back and is located between the sides.

The cabinet cleat mounts to the cabinet cleat top and preferably one of the cabinet sides. The cabinet cleat has a base, a cabinet bracket and a lateral support. The cabinet bracket projects outwardly from the base and has an angled proximal end and a linear end. The lateral support extends outwardly from the base and angles parallel to one of the sides.

In another embodiment, an apparatus for a motor vehicle frame having a roof includes a stowage cabinet with a cabinet cleat and a roof cleat engaging the cabinet cleat. The stowage cabinet has a front, a back, and sides, as well as a cabinet cleat top extending from the front toward the back and located between the sides. The cabinet cleat mounts to the cabinet at the cabinet cleat top.

The cabinet cleat has a base and a cabinet bracket. The cabinet bracket has an angled proximal end and a linear end. The cabinet bracket projects from the base at the angled proximal end.

The roof cleat has a plate and a roof bracket. The roof bracket extends outwardly from the plate and has an angled plate end. A hook extends from the roof bracket distal to the plate. The roof cleat fastens to the roof.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a partial perspective view of a roof cleat of the invention mounted to the roof of a vehicle;

FIG. 6 is a partial side perspective view of a cabinet with a cabinet cleat of the invention mounted on the top front of the cabinet;

FIG. 8 is a bottom perspective view of part of a fixture of the invention nested within a roof cleat of the invention;

DETAILED DESCRIPTION OF THE INVENTION

Figure 3:
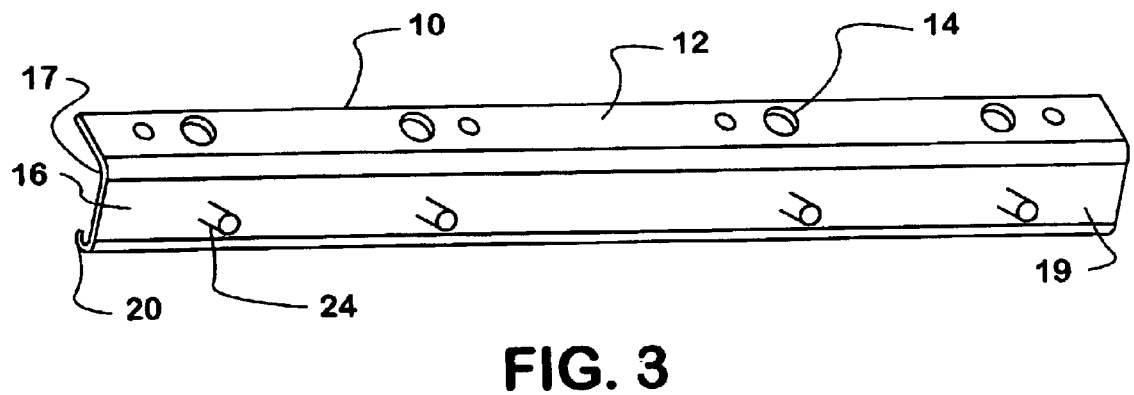
FIG. 3 is a back perspective view of a roof cleat of the invention.

Turning to the figures where like reference numerals refer to like structures, the stowage cabinet of the invention installs to the frame of a motor vehicle with the help of a pair of cleats. FIGS. 3 and 4 show roof cleat 10 with roof bracket 16 extending outwardly at plate end 17 from plate 12, preferably along the length of plate 12. Roof bracket 16 has first 18 and second 19 faces. Plate 12 can have arms extending laterally beyond roof bracket 16 (not shown). Hook 20 extends along the length of roof bracket 16 distal to plate 12. Roof cleat 10 can have apertures 14, fasteners 24, and the like, to fasten roof cleat 10 to the vehicle. Preferably, plate 12 is designed to fit flat against roof 58 and roof bracket 16 is designed to extend away from roof 58.

In a truck or motor vehicle, roof cleat 10 can attach to the frame of the vehicle after attaching the headliner or skin. Plate 12 of roof cleat 10 is positioned onto roof 58 of the vehicle at the desired location, such as at the location of a wardrobe. Roof bracket 16 preferably hangs away from roof 58. Fastening means attach roof cleat 10 to roof 58 of the vehicle frame. If the headliner is attached, fastening means can pierce the headliner to insert into the vehicle frame. Fastening means include any means commonly used in the industry, such as bolts, screws, rivets, rivet nuts, chemical bonding, and the like, or a combination thereof. Roof fasteners 22, for example, insert through apertures 14 in plate 12 into roof 58 to fasten roof cleat 10 to roof 58.

Figure 1:
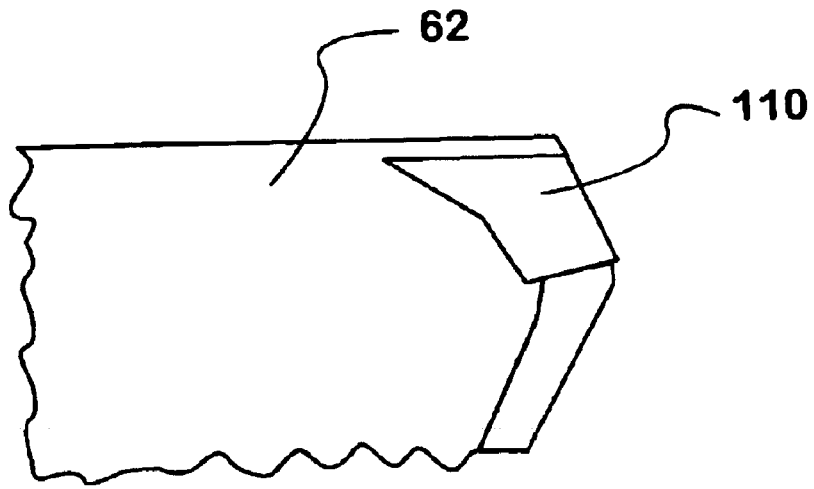
FIG. 1 is a partial side view of a cabinet with a prior art cabinet mount mounted on the top front of the cabinet.
Figure 2:
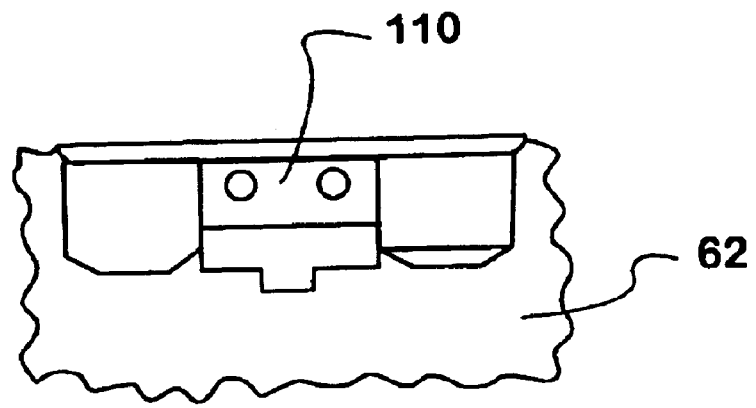
FIG. 2 is a partial front plan view of a cabinet with a prior art cabinet mount.
Figure 5:
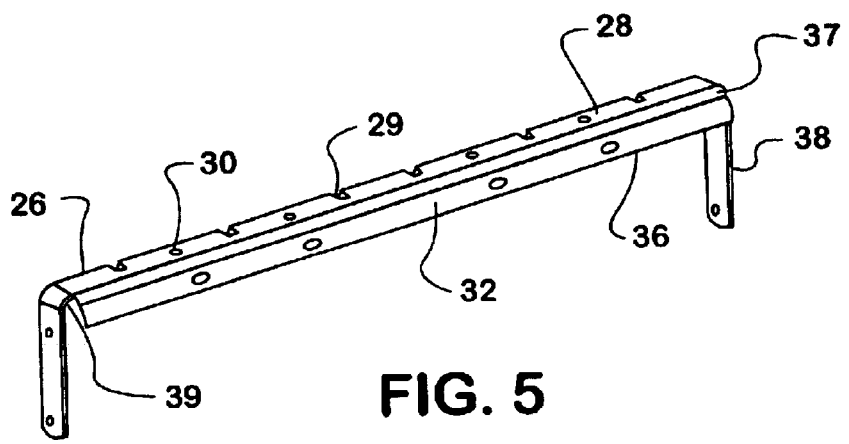
FIG. 5 is a perspective view of a cabinet cleat of the invention.
Figure 7:
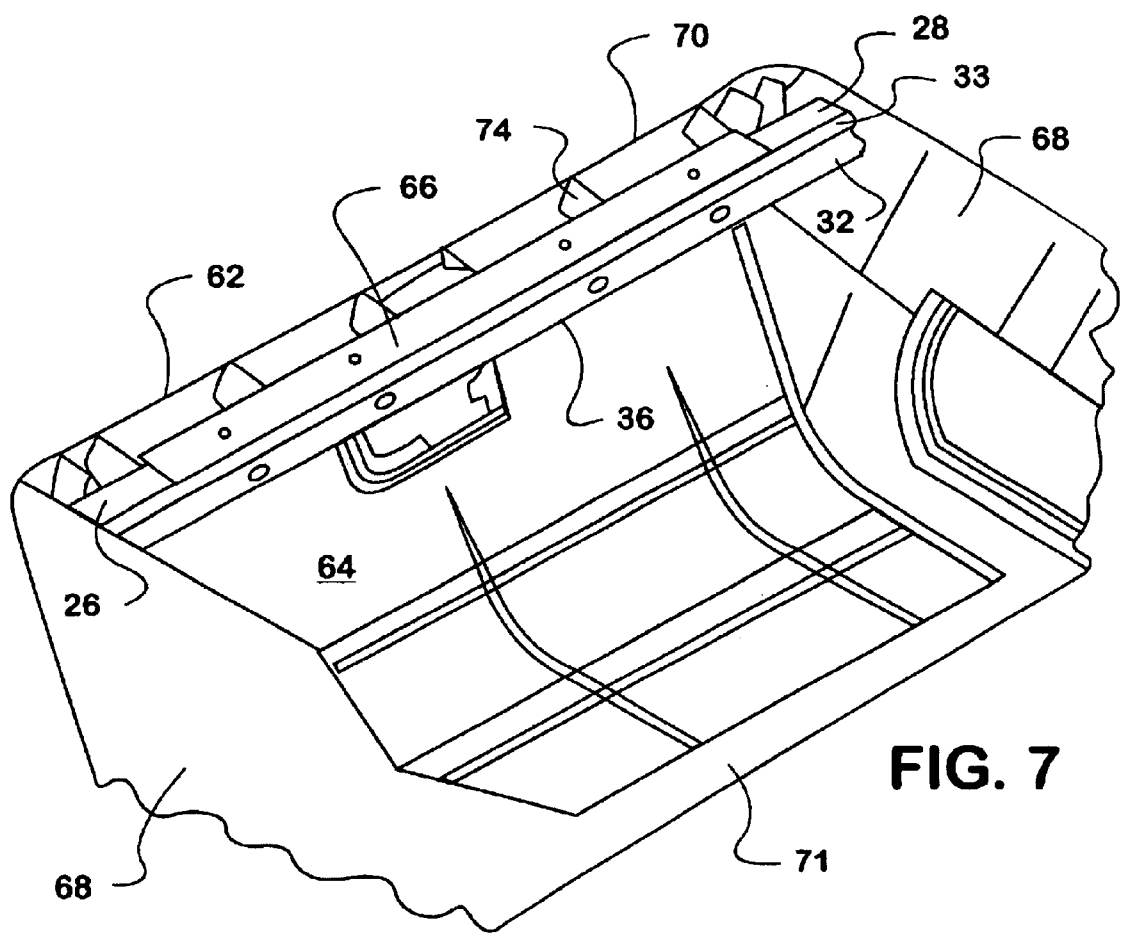
FIG. 7 is partial perspective view of a cabinet with a cabinet cleat of the invention mounted on the top front of the cabinet.
Figure 12:
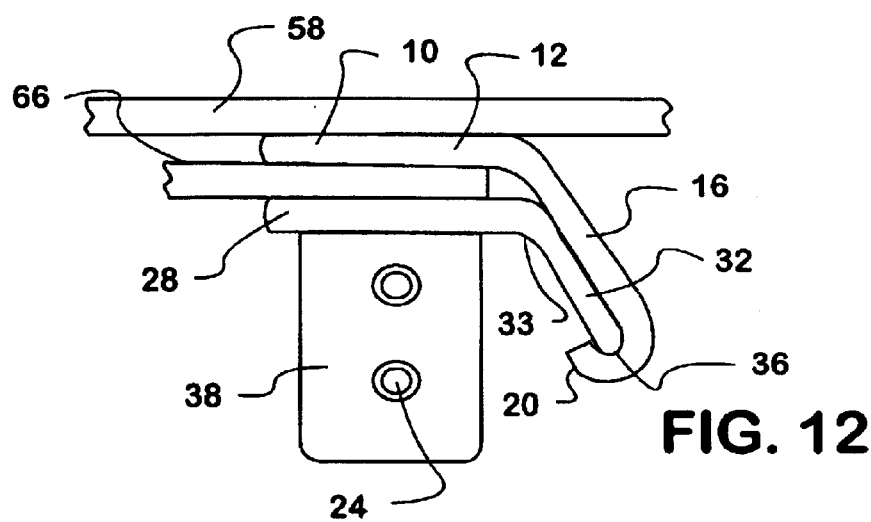
FIG. 12 is a partial cross-sectional view along line a–a' of FIG. 11 of the cabinet and roof with a cabinet cleat nested within a roof cleat with a partial view of the cabinet and roof.

As shown in FIGS. 5–7, cabinet cleat 26 has base 28 and cabinet bracket 32 projecting outwardly along the length of base 28. Cabinet bracket 32 has an angled proximal end 37 and a linear end 36. Angled proximal 37 end of cabinet bracket 32 preferably curves or angles proximally from base 28. Linear end 36 extends linearly outward toward distal end 33. Cabinet bracket 32 has inner 34 and outer 35 faces.

One or two lateral supports 38 extend from base 28. Lateral supports 38 have base ends 39 that preferably curve or angle proximally from base 28, then extend linearly outward that is parallel to cabinet side 68. Cabinet cleat 26 can have openings 30, fasteners, and the like, for mounting to cabinet 62 and roof cleat 10. Cabinet, cleat 26 can also have notches or other cutouts to conform with the design of cabinet 62 and/or cabinet hardware.

Figure 10:
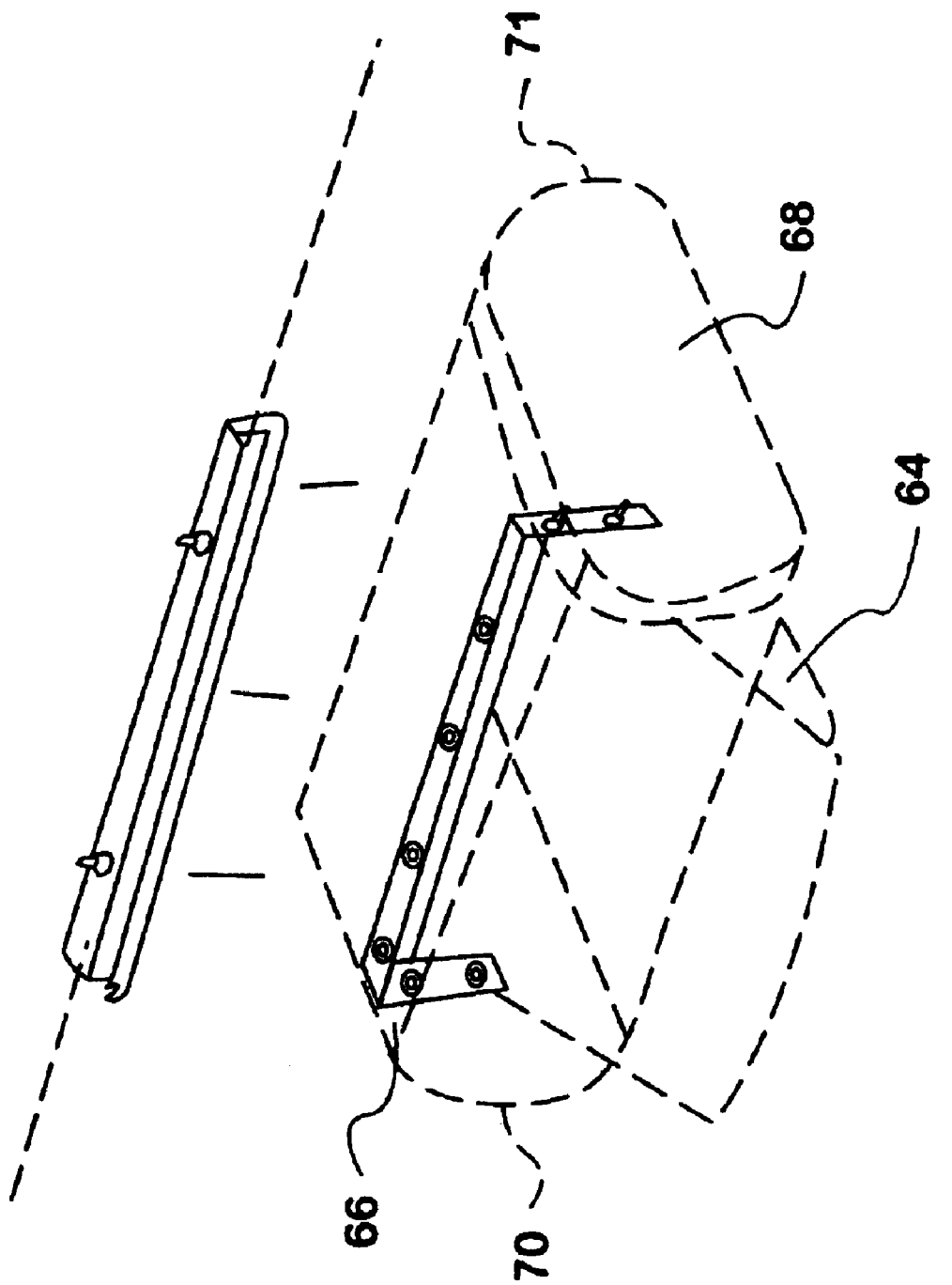
FIG. 10 is a perspective exploded view of the cabinet with the attached cabinet cleat and roof cleat with the cabinet and the roof in phantom.
Figure 11:
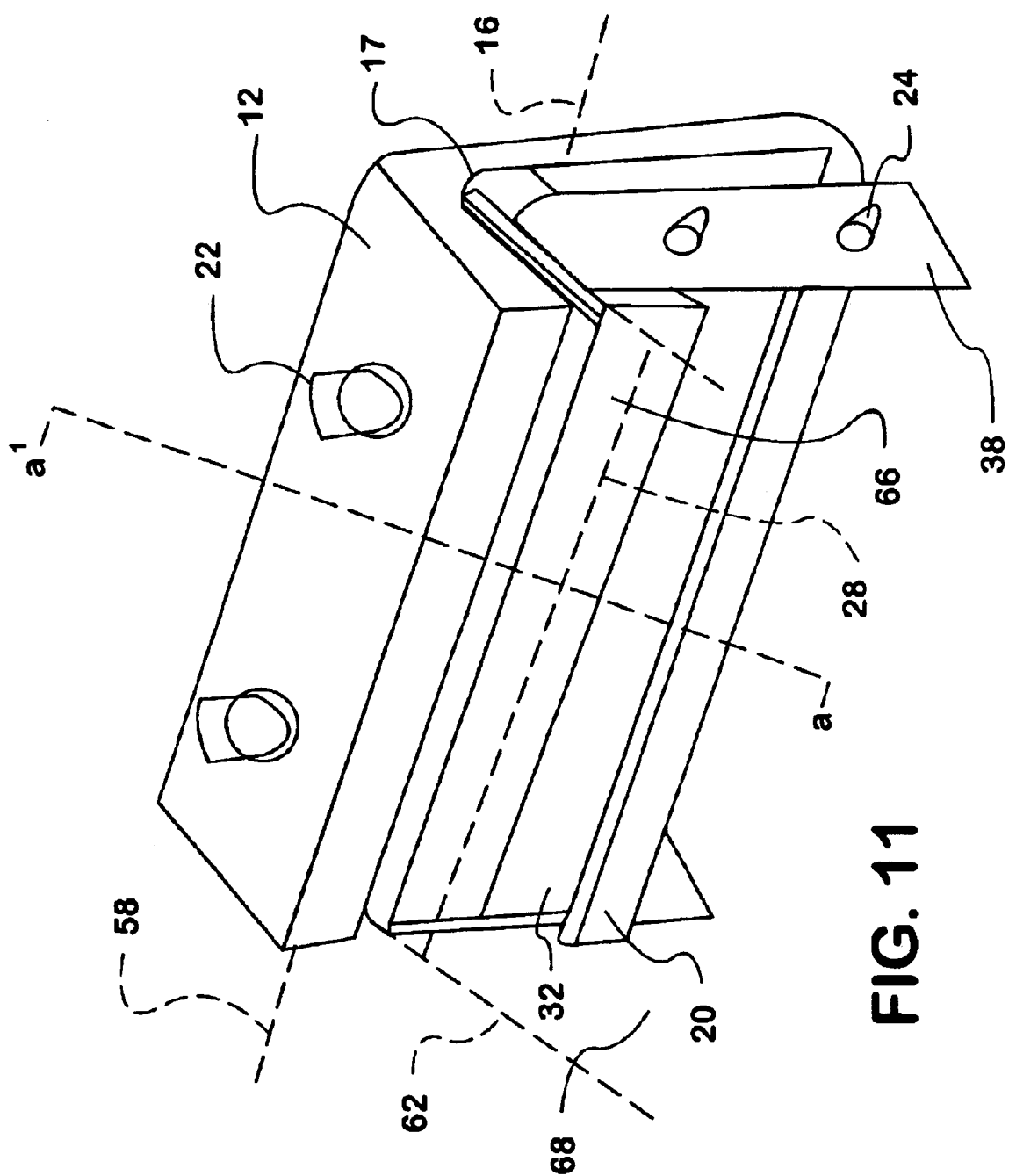
FIG. 11 is a perspective view of the nested cabinet cleat and roof cleat with a partial roof and cabinet in phantom.

As shown in FIG. 7, cabinet 62 has front 70, back 71 and sides 68 extending between front 70 and back 71. Cabinet cleat top 66 extends from front 70 toward back 71 between sides 68. Cabinet 62 can also have trim frame 74, such as at front 70 and can support and/or attach to cabinet cleat top 66. Door 64 opens and latches at front 70. (FIG. 10).

While cabinet cleat 26 can be integral with cabinet 62, especially cabinet cleat top 66, preferably cabinet cleat 26 mounts to cabinet 62. Base 28 and lateral supports 38 of cabinet cleat 26 mount near the top and the front interior of cabinet 62 using mounting means at cabinet cleat top 66. In this embodiment cabinet cleat 26 mounts below cabinet cleat top 66. Other designs of the cabinet, however, may allow cabinet cleat 26 to mount above cabinet cleat top 66. Cabinet cleat 26 mounts to cabinet cleat top 26 using any method common to the industry, such as bolts, screws, rivets, rivet nuts, chemical bonding, fusing, and the like, or a combination thereof. Cabinet fasteners 24, for example, insert through openings 30 of base 28 into cabinet cleat top 66 to mount cabinet cleat 26 to cabinet cleat top 66. Similarly, cabinet fasteners 24 Insert through openings of lateral support 38 to mount to cabinet side 68. Cabinet cleat 26 is preferably mounted to cabinet 62 prior to mounting the trim onto cabinet 62. Cabinet cleat 26 is preferably located behind the door latch.

Inside the vehicle, cabinet 62 is positioned by aligning cabinet cleat 26 with roof cleat 10. Cabinet bracket 32 is inserted into roof cleat 10, and if desired, any additional brackets. Inner face 34 of cabinet bracket 32 contacts first face 18 of roof bracket 16. Hook 20 engages distal end 36 of cabinet bracket 32 and allows cabinet bracket 32 to nest within roof cleat 10. Any apertures and/or fasteners of cabinet cleat 26 and roof cleat 10 are aligned. Once positioned and aligned, cabinet bracket 32 is fastened to roof bracket 16, such as by using riv nuts.

After the cabinet and roof cleats are fastened together, cabinet 62 can be fastened to the vehicle's frame as well as other cabinets. Cabinet 62, for example, fastens onto bracket 72 of wall 60.

Figure 9:
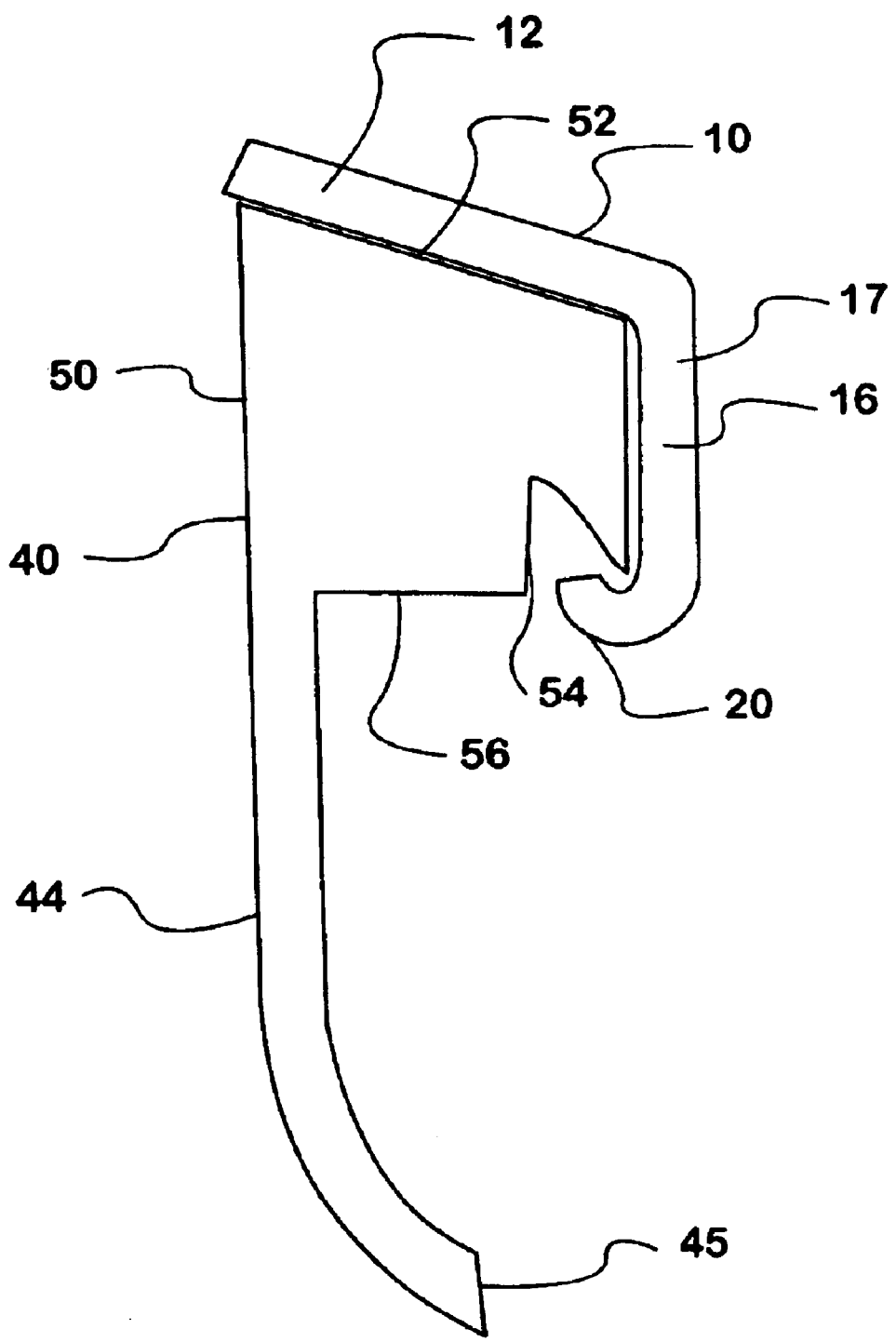
FIG. 9 is a side view of part of a fixture of the invention nested within a roof cleat of the invention.

In the embodiment shown in FIGS. 8 and 9, fixture 40 inserts into roof cleat 10 to help align and support roof cleat 10 in position while fastening roof cleat 10 to roof 58. Fixture 40 positions roof cleat 10 in the same manner as cabinet 26. Fixture 40 has head 42 with sides 50, 52, 54, 56. Second side 52 of head 42 can join first side 50 at an angle less than 90$^N$. Shoulder 48 extends from second side 52 of head 42 and extends away from third side 54 of head. The design of both the second side 52 of head 42 and shoulder 48 should complement the design of roof cleat 10. Second side 52 of head 42 engages plate 12, while angled shoulder 48 engages first face 18 of roof bracket 16 and can engage hook 20 to allow fixture 40 to nest within roof cleat 10. Throughholes 46 extend from second side 52 to fourth side 56 of head 42. Throughholes 46 align with apertures 14 of plate 12. Once roof cleat 10 is positioned onto roof 58, fasteners are inserted into throughholes 46 to fasten roof cleat 10 into the vehicle's roof and fixture 40 is removed.

Handle 44 of fixture 40 extends from first side 50 of head 42 opposite shoulder 48 and between throughholes 46. Handle 44 can angle inwardly toward wall and may curve at distal end 45 distal to head 42. Fixture 40 can rest against bracket 72 and/or brace against the wall 60 to hold roof cleat 10 in place before fastening to roof.

The method of the invention allows a stowage cabinet and bin to be easily and efficiently fastened to the frame of a vehicle. The cabinet fastens securely to the frame without first requiring the removal of the door. An installer can fasten the cleats together and leave the cabinet hanging place. The installer can then step away to retrieve a drill and additional fasteners to fasten the cabinet itself to the frame or other cabinet. In addition, the cabinet cleat can be installed at the factory where the cabinet is manufactured, allowing for more efficiency at the assembly line and increased productivity.

The cleats can be sized to fit the size of the cabinet. A wider cabinet can use wider cabinet and roof cleats, while a narrower cabinet can use narrower cabinet and roof cleats.

The lateral support of the cabinet cleat attach the cabinet cleat to the cabinet at additional places of support is another advantage. The use of the lateral supports also strengthen the cabinet's corners.

By using the cleat of the invention to fasten the stowage cabinet to the vehicle, overtighting the fasteners does not distort the cabinet's exterior. Any overtighting occurs on the cleat and are hidden, not on the cabinet frame. This allows faster installation of the cabinet in the vehicle without worrying about the final appearance of the storage cabinet.

While the invention is shown in only one of its forms, it is not thus limited but is susceptible to various changes and modifications without departing from the spirit and scope of the invention.

What is claimed is:

1. An apparatus for a motor vehicle with a frame having a roof comprising:

a stowage cabinet having a front, a back, and sides therebetween;

a cabinet cleat top being located between the sides of the cabinet;

a cabinet cleat mounted to the cabinet cleat top, the cabinet deat comprising a base, and a cabinet bracket having an angled proximal end and a linear end and projecting outwardly and downwardly from the base at the angled proximal end toward the back of the cabinet;

a roof cleat engaging the cabinet cleat, the roof cleat comprising a plate, a roof bracket having an angled plate end and extending outwardly from the plate at the angled plate end, and a hook extending from the roof bracket distal to the plate; and fastening means for fastening the roof cleat to the roof.

2. An apparatus for a motor vehicle having a roof of claim 1, wherein the linear end distal to the base engages the hook.

3. An apparatus for a motor vehicle having a roof of claim 2, wherein the cabinet cleat mounts to the cabinet cleat top with cabinet fasteners extending through openings in the base and into the cabinet cleat top.

4. An apparatus for a motor vehicle having a roof of claim 3, wherein the fastening means further comprises:

roof fasteners extending through apertures in the plate and into the roof.

5. An apparatus for a motor vehicle having a roof of claim 4, wherein the cabinet cleat further comprises:

a lateral support extending outwardly from the base and mounted to an interior of one of the sides of the cabinet.

6. A stowage cabinet for a motor vehicle comprising:

a front, a back, and sides therebetween;

a cabinet cleat top being located between the sides;

a cabinet cleat comprising a base, a cabinet bracket, and a lateral support;

the cabinet bracket having an angled proximal end and a linear end, the linear end projecting outwardly and downwardly from the angled proximal end toward the back;

the lateral support extending from the base and mounted to an interior of one of the sides of the cabinet; and the base having openings and projecting from the angled proximal end of the cabinet bracket toward the front and being mounted to the cabinet cleat top.

7. The stowage cabinet for a motor vehicle of claim 6, wherein the base mounts to the cabinet cleat top with cabinet fasteners extending through the openings and into the cabinet cleat top.

8. The stowage cabinet for a motor vehicle of claim 6, further comprising:

a trim frame supporting the cabinet cleat top.

* * * * *